(12) United States Patent
Molland et al.

(10) Patent No.: US 8,924,505 B2
(45) Date of Patent: Dec. 30, 2014

(54) METHOD AND DEVICE FOR CONFIGURING A USER AGENT TO OPERATE AS A WEB SERVER

(75) Inventors: Håvard Molland, Stavanger (NO); Arve Bersvendsen, Tarnasen (NO)

(73) Assignee: Opera Software ASA, Oslo (NO)

( * ) Notice: Subject to any disclaimer, the term of this patent is extended or adjusted under 35 U.S.C. 154(b) by 400 days.

(21) Appl. No.: 12/649,498

(22) Filed: Dec. 30, 2009

(65) Prior Publication Data

US 2010/0198938 A1  Aug. 5, 2010

Related U.S. Application Data

(60) Provisional application No. 61/141,707, filed on Dec. 31, 2008.

(51) Int. Cl.
*G06F 15/16* (2006.01)
*H04L 29/08* (2006.01)

(52) U.S. Cl.
CPC .......... *H04L 29/08846* (2013.01); *H04L 67/02* (2013.01)
USPC .......................................... 709/217; 709/230

(58) Field of Classification Search
CPC ...................................................... H04L 67/02

USPC ........................... 709/217, 200, 230; 370/352
See application file for complete search history.

(56) References Cited

U.S. PATENT DOCUMENTS

| | | | |
|---|---|---|---|
| 7,646,775 B2 * | 1/2010 | Capone et al. | 370/401 |
| 2004/0199649 A1 * | 10/2004 | Tarnanen et al. | 709/230 |
| 2007/0147339 A1 * | 6/2007 | Forissier et al. | 370/351 |
| 2007/0237133 A1 * | 10/2007 | Woods et al. | 370/352 |
| 2008/0069065 A1 * | 3/2008 | Wu et al. | 370/340 |
| 2008/0297846 A1 * | 12/2008 | Noguchi et al. | 358/1.15 |

* cited by examiner

*Primary Examiner* — Glenford Madamba
(74) *Attorney, Agent, or Firm* — Birch, Stewart, Kolasch & Birch, LLP

(57) ABSTRACT

The present invention is directed toward a computer implemented method and device for configuring a user agent (e.g., a web browser) to act as a web server, and host services to be available to the end users of other user agents (e.g., web browsers) acting as clients. Such services may be provided by executing web widgets written in a scripting language, or provided as simple HTML services. The present invention further provides various techniques (e.g., Network Address Translation (NAT) traversal) for allowing requests for a service to pass to the user agent acting as a server, by making such requests appear to a firewall as responses to an initial request made by the user agent.

17 Claims, 9 Drawing Sheets

METHOD AND DEVICE FOR CONFIGURING A USER AGENT TO OPERATE AS A WEB SERVER

CROSS-REFERENCE

This non-provisional application claims priority under 35 U.S.C. §119(e) on U.S. Provisional Application No. 61/141,707, filed Dec. 31, 2008, the entire contents of which are incorporated herein by reference into the present application.

FIELD OF THE INVENTION

The invention relates generally to a web server module implemented on a web browser, which provides a communication between user agents at least one of which being configured to operate as a server. Furthermore, the invention relates to the use of widgets to provide network services by being opened by a user agent operating as a server.

BACKGROUND OF THE INVENTION

Computer users typically use user agent applications such as web browsers to access documents and other resources that are available over a computer network, e.g., the World Wide Web. Resources available on the World Wide Web (also referred to simply as "the Web") are generally stored in documents called web pages. Such web pages are identified by a Uniform Resource Identifier (URI), usually a Uniform Resource Locator (URL), which identifies the web page uniquely and provides the information necessary for locating and accessing the web page.

A web browser is a computer program that, when executed on a client computer, enables the client computer to read and display web pages. A web browser includes a user interface component for addressing a particular server on a network, and designating a particular document (e.g., a Web page) to be obtained from the addressed server. Using the Hypertext Transfer Protocol (HTTP), a Web browser may fetch the designated documents from the server. Also, a Web browser includes a component for displaying the content of Web pages.

Web pages may be stored on a component connected to the network (e.g., the Web), which is called a web server. Generally, a web server receives and responds to HTTP requests from a user agent or web browser. There are existing methods for configuring a particular user agent on a client computer to operate as a web server for receiving and responding to HTTP requests from other user agents. However, when a user agent runs as a web server, it is necessary to provide information regarding which information or services can be accessed from that web server and how they can be accessed. Additionally, when a user runs a web server in a home network, the network typically includes a device that acts as a firewall, and/or Network Address Translation (NAT) device, that needs to be configured separately. Typically, the user will need to open ports and enable port forwarding to a local computer in order for people outside the firewall to be able to access the server. Consequently, even if a user is able to provide content from a web server that runs as part of his or her browser application, there is currently no way to avoid considerable configuration tasks.

Consequently, it would be advantageous to reduce or eliminate the configuration tasks that otherwise must be performed in order to give other users access to shared content or services, and to make this content or these services visible or discoverable to those other users.

SUMMARY OF THE INVENTION

According to an exemplary embodiment of the present invention, a user agent (e.g., web browser) is configured to operate as a web server and conduct communications with an external server to establish a communicative link to another user agent via the Internet, and deliver content via the communicative link to transmit the content to the other user agent.

For instance, the established communicative link may be a connection established, e.g., using Transfer Control Protocol (TCP). This connection may further be established according to a Network Address Translation (NAT) traversal protocol or technique, conducted in accordance with an external server.

According to another exemplary embodiment of the present invention, the user agent may be configured to perform NAT traversal to establish a TCP connection to an external server to register a service corresponding to the stored script.

The user agent may further be configured to execute a widget that represents the content or generates the content to be delivered to the other user agent.

According to another exemplary embodiment of the present invention, the other user agent may also be configured to operate as a web server. Furthermore, the other user agent may be configured to execute a corresponding widget, enabling collaborative interaction between the first user agent and the other user agent.

Further aspects and features of the present invention will become evident to those skilled in the art through the detailed description of various examples and embodiments, the drawings and the appended claims.

DETAILED DESCRIPTION

Figure 1:
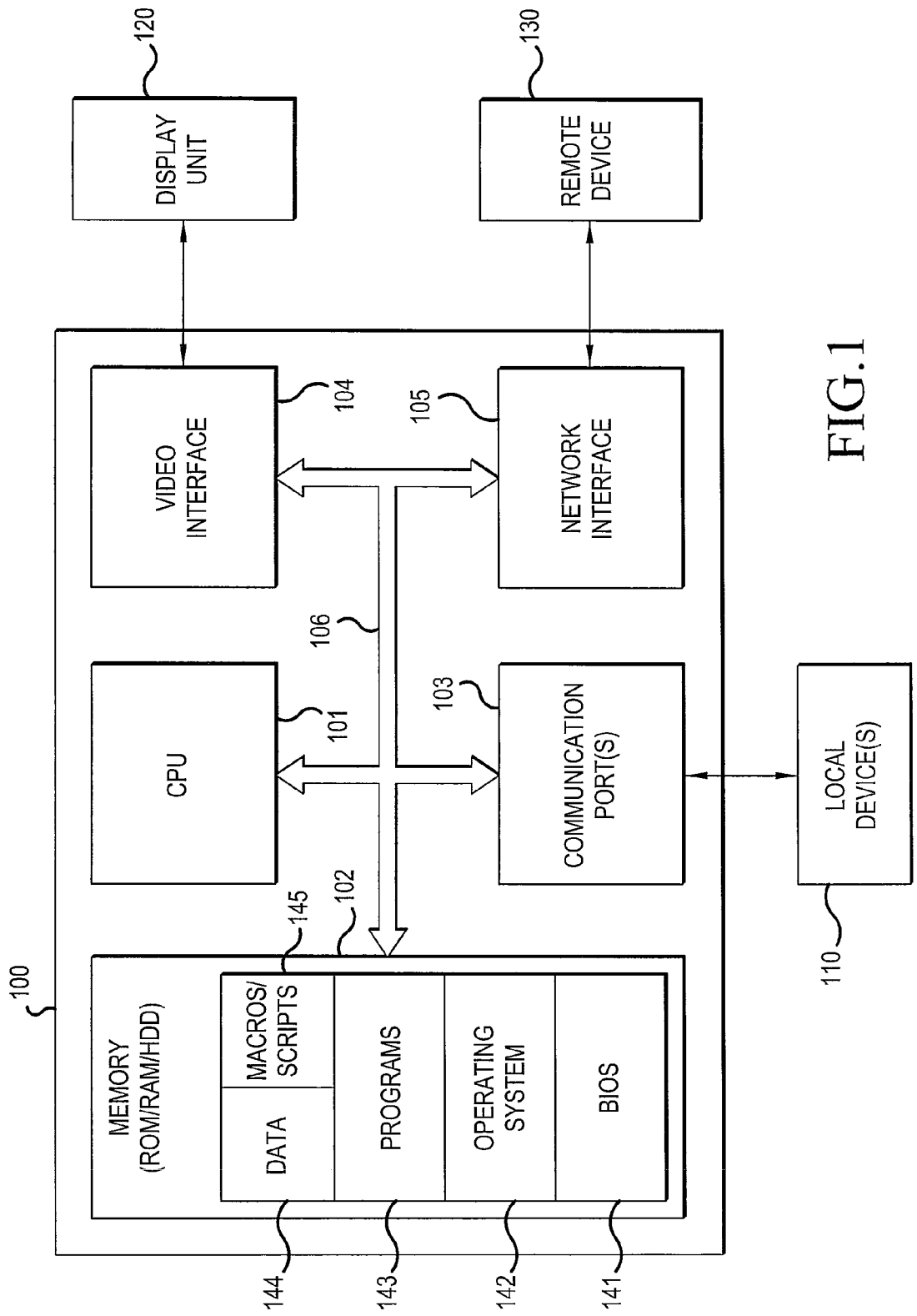
FIG. 1 is a computing device that can be used to implement an exemplary embodiment of the present invention.

The present invention is directed toward a computer implemented method and a device for implementing a web server module on a user agent such as a web browser. The web server module can enable the user agent to act as a web server, and host services to be made available to the end users of other user agents (e.g., web browsers) acting as clients. Such services may be provided by executing scripts written in a scripting language, or provided as simple HTML documents.

When content is made available from web servers, there are generally two distinct, but related, problems that will have to be addressed. The first concerns the fact that when a server is making content available to user agents, or browsers, the users of those user agents will need a way of determining what content or which services are available, and how to direct their user agents to this content. As to the second problem, when a user agent correctly addresses content available from a server, the request must be able to reach the server agent, even if the latter is located behind a firewall and/or a NAT device.

According to an exemplary embodiment, a user agent acting as a web server according to the present invention (referred to herein as "server agent" or "server browser") may provide services to other user agents (referred to herein as a "client agents" or "client browsers") via server widgets. Widgets are small applications designed to do simple tasks. In the context of this specification, widgets, or web widgets, will primarily refer to small applications that are written in a script language and executed by the script engine of a user agent such as a web browser. A web widget may be used to access and present content downloaded from a network. Server widgets are widgets that are executed by the script engine of a web server, and may be used to provide content to a web page which is not static. For example, servers may use server widgets to provide services to end users such as showing the current weather and latest news. Other widget-based services include providing virtual interactive tools to end users, e.g., desktop notes, slide shows, and chat windows. Many web widgets are written in JavaScript language (or ECMAScript), but could be written in other scripting languages. In the above embodiment, the server agent may include a script engine (e.g., JavaScript engine) for executing such widgets.

Widgets may be provided as a collection of script and data files delivered in a package that make them easy to install. However, the present invention is not limited in this respect, and the term "widget" as used within this description and accompanying claims should be interpreted to encompass any script or collection of scripts and/or data that provides dynamic functionality when executed by a script engine.

According to one embodiment of the present invention, the web server module may be implemented as a part of the user agent's native code. However, in an alternative embodiment, the web server module itself may be implemented in the server agent as a widget. As such, a user agent may first execute the web server widget to configure itself as a server agent capable of providing services to client agents.

The server agent may register the content or services, which are to be made available to client agents, with an external web server which may be referred to as a discovery server. Other user agents may send HTTP requests to the discovery server to obtain a web page listing the services that have been registered with the discovery server. The client agent may then send an HTTP request for a particular one of these services to the discovery server, and the request may then be forwarded to the server agent. Alternatively, the client agent may connect directly to the server agent, e.g., by using address information provided by the discovery server, or based on an IP redirect. According to various aspects of the invention discussed in further detail below, a number of strategies may be employed in order to connect to the server agent if it is located behind a firewall or NAT device.

The server agent may also offer services to potential client agents by invitation. After receiving an invitation, the client agent may accept and connect to the server agent and access the content or service provided by the server agent.

Further, according to principles of the present invention, it is possible for a server agent to execute a widget for a collaborative application, and establish a connection (or connections) to a potential client agent (or agents) to invite the potential client agent(s) to participate in the collaborative application. After accepting the invitation, a client agent may download and execute the widget for the collaborative application, and collaboration may be achieved based on the pushing and/or pulling of information via the connection. The step of downloading the widget may be unnecessary if the widget is already present on the client device. According to a further aspect, the aforementioned connection may be established as a direct peer-to-peer (p2p) connection between the server and client agents, for example, when NAT traversal or port opening has been successful. The aspect of providing p2p push and pull communications between two instances of the same widget would be advantageous in allowing widget developers to create p2p applications without the need of a conventional web server.

FIG. 1 illustrates a generalized computing device 100 that can be used as an environment for implementing various aspects of the present invention. In FIG. 1, a device 100 has various functional components including a central processor unit (CPU) 101, memory 102, communication port(s) 103, a video interface 104, and a network interface 105. These components may be in communication with each other by way of a system bus 106.

The memory 102, which may include ROM, RAM, flash memory, hard drives, or any other combination of fixed and removable memory, stores the various software components of the system. The software components in the memory 102 may include a basic input/output system (BIOS) 141, an operating system 142, various computer programs 143 including applications and device drivers, various types of data 144, and other executable files or instructions such as macros and scripts 145. As such, the memory 102 is an example of a computer readable storage device which stores computer instructions that are used to implement various features of the present invention in the computing device 100.

The communication ports 103 may be connected to one or more local devices 110 such as user input devices, a printer, a media player, external memory devices, and special purpose devices, for example, a global positioning system receiver (GPS). Communication ports 103, which may also be referred to as input/output ports (I/O), may be any combination of such ports as USB, PS/2, RS-232, infra red (IR), Bluetooth, printer ports, or any other standardized or dedicated communication interface for local devices 110.

The video interface device 104 is connected to a display unit 120 which may be an external monitor or an integrated display such as an LCD display. The display unit 120 may have a touch sensitive screen and, in that case, the display unit 120 doubles as a user input device. The user input device aspects of the display unit 120 may be considered as one of the local devices 110 communicating over a communication port 103.

The network interface device 105 provides the device 100 with the ability to connect to a network in order to communicate with an external server 130 and other remote devices 140. The communication network, which in FIG. 1 is only illustrated as the line connecting the network interface 105 with the remote device 130, may be, e.g., a local area network or the Internet. The external server 130 may in principle be any computing device providing services over a network, but typically be a web server providing services over the World Wide Web.

It will be understood that the device 100 illustrated in FIG. 1 is not limited to any particular configuration or embodiment regarding its size, resources, or physical implementation of components. For example, more than one of the functional components illustrated in FIG. 1 may be combined into a single integrated unit of the device 100. Also, a single functional component of FIG. 1 may be distributed over several physical units. Other units or capabilities may of course also be present. Furthermore, the device 100 may, e.g., be a general purpose computer such as a PC, or a personal digital assistant (PDA), or even a cellphone or a smartphone.

Figure 2:
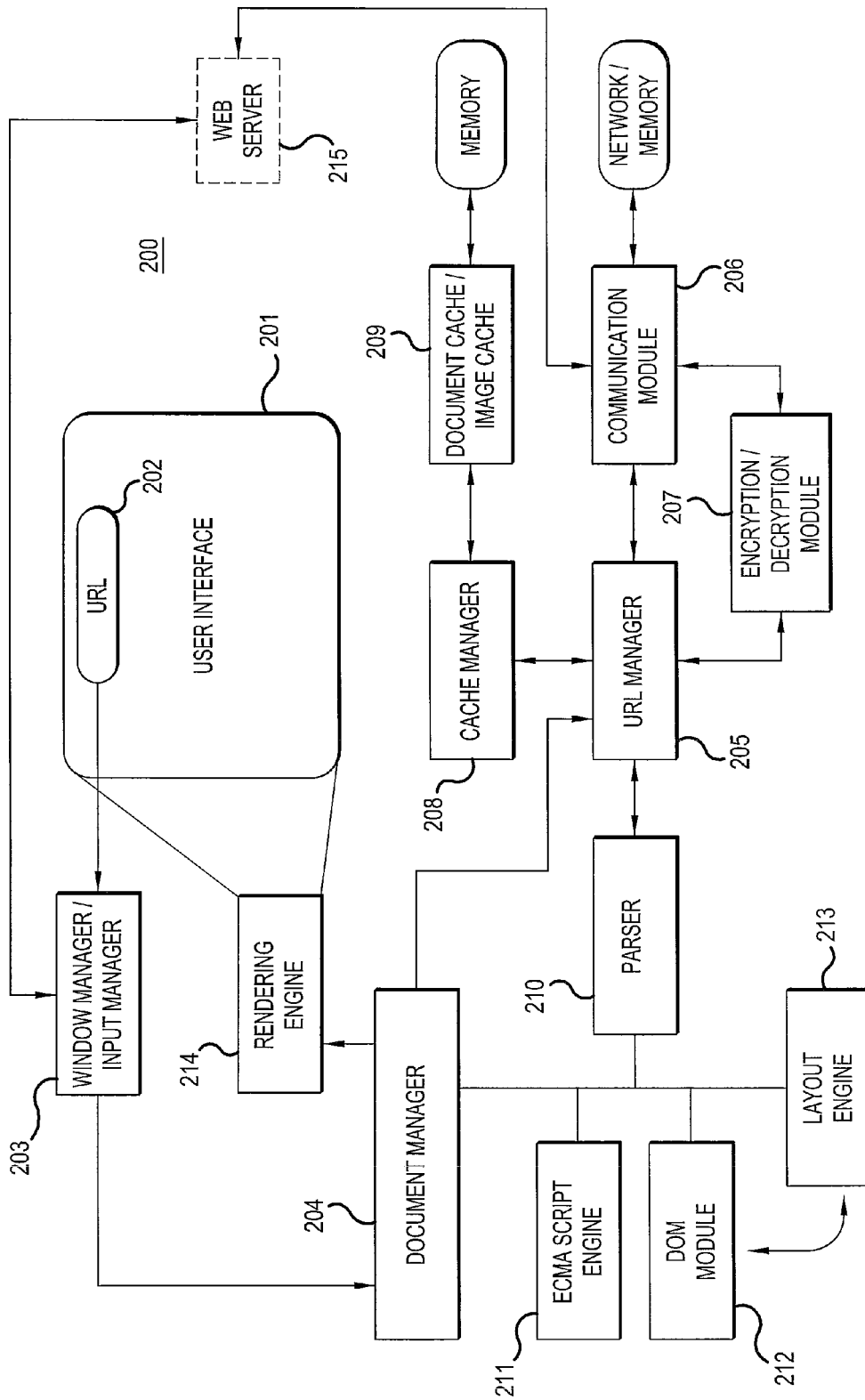
FIG. 2 is a user agent for accessing data resources in accordance with an exemplary embodiment of the present invention.

In an exemplary embodiment, various aspects of the present invention may be incorporated into, or used in connection with, the components and/or functionality making up a user agent or browser installed as an application on a device 100. FIG. 2 shows an example of a number of modules that may be present in such a user agent or browser. The modules will typically be software modules, or otherwise implemented by a programmer in software, and may be executed by the CPU 101. However, it is also possible for any of the modules of FIG. 2 to be implemented as hardware, a combination of hardware and software, or "firmware," as will be contemplated by those skilled in the art.

The user agent or browser 200 presents the user with a user interface 201 that may be displayed on the display unit 120 shown in FIG. 1. The user interface 201 may include an address field 202 where the user may input or select the URL of a document or a service he or she wants the user agent 200 to retrieve. For example, the user may use an input device (e.g., keyboard) to type in the URL in the address field 202. The address field 202 may also be a link that is displayed and may be activated by the user using a pointing device such as a mouse. Alternatively the URL may be specified in the code of a document or script already loaded by the user agent 200.

In any case, the URL may be received by a window and input manager 203 that represents the input part of the user interface 201 associated with, or part of, the user agent 200. The URL may then be forwarded to a document manager 204, which manages the data received as part of the document identified by the URL.

The document manager 204 forwards the URL to a URL manager 205, which instructs a communication module 206 to request access to the identified resource. The communication module 206 may be capable of accessing and retrieving data from a remote device 130 such as an external server over a network using the hypertext transfer protocol (HTTP), or some other protocol such as HTTPS or FTP. The communication module 206 may also be capable of accessing data that is stored in local memory 102.

If communication outside the device 100 is required to be encrypted, e.g., as specified by the protocol used to access the URL, encryption/decryption module 207 handles communication between the URL manager 205 and the communication module 206.

The data received by the communication module 206 in response to a request is forwarded to the URL manager 205. The URL manager 205 may then store a copy of the received content in local memory 102 using a cache manager 208 which administers a document and image cache 209. If the same URL is requested at a later time, the URL manager 205 may request it from the cache manager 208, which will retrieve the cached copy from the cache 209 (unless the cached copy has been deleted) and forward the cached copy to the URL manager 205. Accordingly, it may not be necessary to retrieve the same data again from a remote device 130 when the same URL is requested a second time.

The URL manager 205 forwards the data received from the communication module 206 or cache 209 to a parser 210 capable of parsing content such as HTML, XML and CSS. The parsed content may then, depending on the type and nature of the content, be processed further by a ECMAScript engine 211 (e.g., a JavaScript engine), a module for handling a document object model (DOM) structure 212, and/or a layout engine 213.

This processing of the retrieved content is administered by the document manager 204, which may also forward additional URL requests to the URL manager 205 as a result of the processing of the received content. These additional URL's may, e.g., specify images or other additional files that should be embedded in the document specified by the original URL.

When the data representing the content of the specified document has been processed, it is forwarded from the document manager 204 in order to be rendered by a rendering engine 214 and displayed on the user interface 201.

The ECMAScript engine 211 described above may be implemented as a JavaScript engine, i.e., a particular type of interpreter for interpreting JavaScript source code and executing the script accordingly. JavaScript is often considered the originating dialect of ECMAScript (JScript being another such dialect). However, no limitation to any particular dialect of ECMAScript is intended. In fact, in the user agent 200, it is possible to replace the ECMAScript engine 211 of FIG. 2 with another type of script engine which interprets and executes a script language that does not fall under the ECMA-262 specification (i.e., the ECMAScript standard).

Further, the user agent 200 may optionally include a web server module 215. According to one embodiment, the web server module 215 is embodied in the native code as an integral part of the user agent 200, for example, programmed in C++. If the web server module 215 is activated, and the user agent receives, for example, an HTTP request over the communication module 206, the request may be forwarded to the server module 215. In turn, the web server module 215 may handle the request by retrieving the requested data, executing any script part of the requested data by sending it to the JavaScript engine 211, and returning any output data to the communication module 206 to be transmitted to the requesting client agent as a response to the request. According to one embodiment of the invention, each web widget service that is opened by the user agent 200 may be associated with a window; consequently, the web server module 215 may receive web widget data from the window manager 203. The web server module 215 may also include NAT traversal capabilities. Further details of the operation of the web server module 215 will be provided below.

It is not a requirement of the present invention for each user agent 200 to include such a web server module 215 (and thus the web server module 215 is illustrated by dotted lines in FIG. 2). For example, a user agent 200 which does not include the web server module 215 may still operate as a client agent according to the principles of the present invention, as will be described below.

The various modules of a user agent 200 thus described are executed by the CPU 101 of device 100 as the CPU 101 receives instructions and data over the system bus(es) 106. The communications module 206 communicates with the remote device 130 using the network interface 105. The functionality of various modules in FIG. 2 may of course be integrated into fewer larger modules. Also, the functionality of a single module in FIG. 2 may be distributed or replicated over several modules.

It will further be understood that, while the user agent 200 described above may be implemented as an application program 143, some of the user agent's 200 functionality may also be implemented as part of the operating system 142 or even the BIOS 141 of the device 100. The content received in response to a URL request may be data 144, script 145, or a combination thereof as further described below.

For purpose of convenience, the terms "user agent," "server agent," "client agent," and "browser" will be used hereinafter to collectively refer to both the components/functionality making up a user agent 200 (as shown in FIG. 2) and the device 100 (as shown in FIG. 1) in which such components/functionality are installed.

Figure 3:
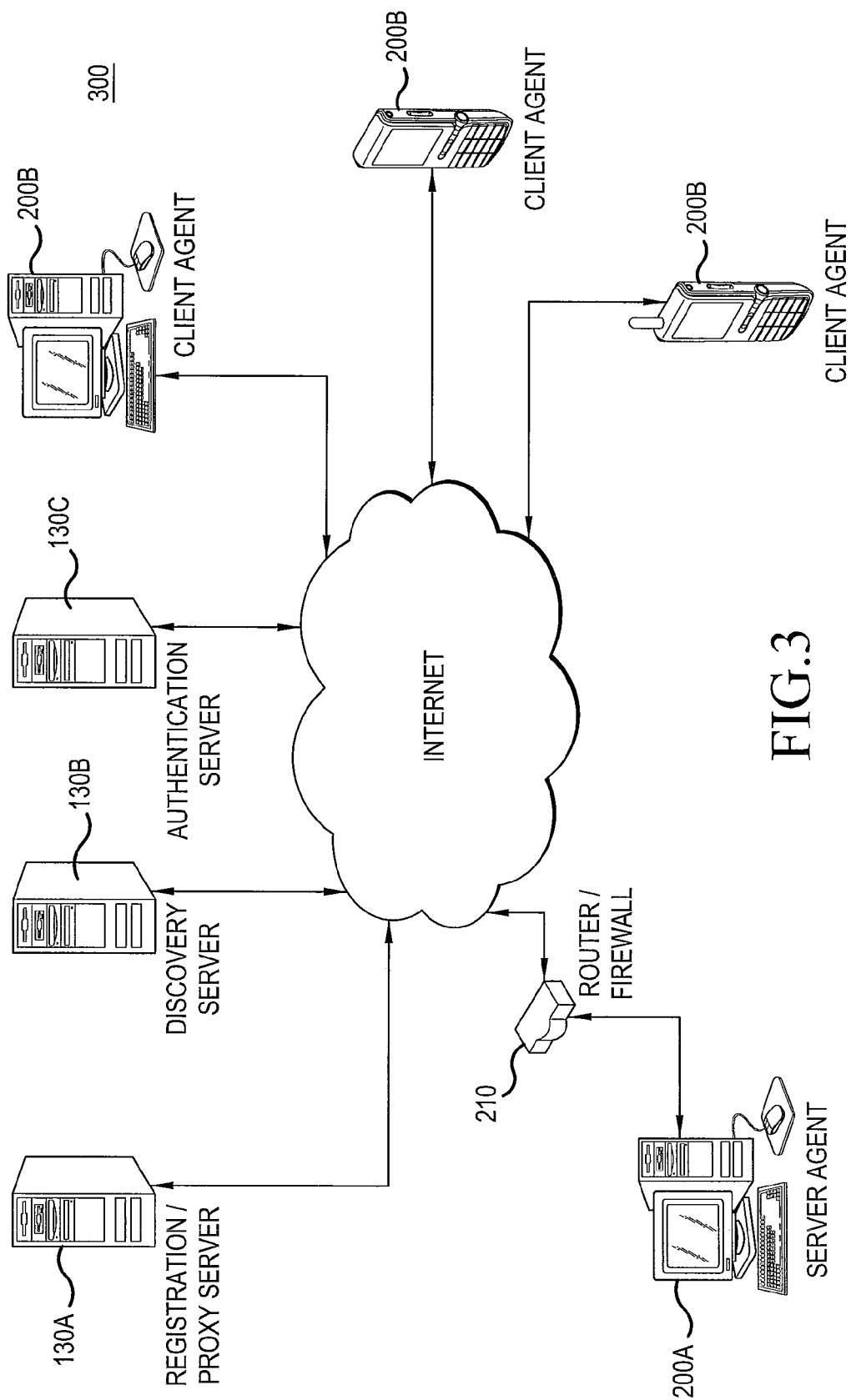
FIG. 3 illustrates a system for implementing principles of the present invention, according to an exemplary embodiment of the present invention.

Reference is now made to FIG. 3, which is a conceptual diagram of an exemplary system 300 in which the principles of the present invention may be implemented. In FIG. 3, the system 300 includes a server agent 200A (i.e., a user agent 200 acting as a web server according to principles of the present invention), client agents 200B (i.e., user agents 200 to which services are provided by the server agent 200A), and multiple external servers 130 connected to the Internet. The server agent 200A is, in this particular example, connected to the Internet over a router/firewall 210.

It is the intent of FIG. 3 to show that user agents 200 may be implemented on various types of computing devices 100. For example, FIG. 3 illustrates that a particular client agent 200B may be implemented in a general desktop computer, cell phone, or personal digital assistant (PDA). Of course, it will be readily apparent to those of ordinary skill in the art that other types of devices 100 could be used to run any user agent 200, including client agents 200B and server agents 200A, according to the present invention.

FIG. 3 illustrates a particular exemplary embodiment where the external servers 130 include a registration/proxy server 130A, a discovery server 130B and an authentication server 130C. However, it should be noted that FIG. 3 is for purposes of illustration only, and the principles of the present invention may be implemented using a lesser or greater number of external servers 130. For instance, it will be readily apparent from this disclosure that the functionality described with respect to servers 130A-C may be implemented using any number of external servers 130 as will be contemplated by persons of ordinary skill in the art.

One of the purposes of the registration/proxy server 130A is to authenticate and register (i.e., log in) the end users of user agents or browsers 200. Accordingly, the registration/proxy server 130A may perform one or more of the following functions: opening new accounts for end users, ensuring that usernames for end users are valid, defining permissions for end users, defining device names for the user agents 200, etc. The registration/proxy server 130A may also perform other functions associated with conventional web servers, e.g., downloading applications (e.g., widgets) or other forms of content to user agents or browsers 200. The authentication process may be performed with the assistance of authentication server 130C as described in further detail below.

However, according to an exemplary embodiment, the registration/proxy server 130A may also be responsible for registering the services to be provided by a server agent 200A with the discovery server 130B. The discovery server 130B may then respond to HTTP requests from other user agents 200B regarding the available services. For example, the discovery server 130B may respond to a request for URLs associated with the username of the server agent 200A by providing a web page listing the services available from the server agent 200A. A client agent 200B may then request a particular service by issuing an HTTP request including the URL associated with that service. According to some embodiments, such a request may be issued directly to the server agent 200A. According to other embodiments, the request is sent to the registration/proxy server 130A. The registration/proxy server 130A may then respond to such an HTTP request from a client agent 200B for a specific service offered by the server agent 200A by relaying the request to the server agent 200A using a special control connection. Accordingly, the registration/proxy server 130A may act as a transparent HTTP proxy between the server agent 200A and the client agent 200B in certain situations.

In an exemplary embodiment, the registration/proxy server 130A is also capable of operating as a NAT traversal server. Such a NAT traversal server could be used for coordinating a peer-to-peer connection (e.g., a Transfer Control Protocol (TCP) connection) directly between the server agent 200A and client agent 200B or, if necessary, between the server agent 200A and HTTP proxy (registration/proxy server 130A). The server agent 200A may then use this p2p connection to provide services to the client agent 200B.

Network Address Translation (NAT) refers to the translation of an Internet Protocol (IP) address used within one network (e.g., local network) to a different IP address known within another network (e.g., public network). In a typical NAT configuration, a local network designates "private" IP addresses to the local computers and to a router (referred to herein as a "NAT router"). The NAT router is also connected to the Internet with one or more "public" IP addresses. As traffic passes from the local network to the Internet, the NAT router translates the source address of the packets from the private to public IP address, and also stores information regarding the active connection being used (destination address and port number). When receiving a reply to the packets, the NAT router uses the stored connection information to determine to which machine in the local network to forward the reply.

"NAT traversal" refers to the technique whereby two devices 100 establish a connection even though they are in different TCP/IP networks and at least one of them is behind a NAT router. According to an exemplary embodiment, the type of NAT traversal technique employed by the invention is an extension of the STUN (Simple Traversal of UDP through NATs) protocol, which is called the STUNT (STUN and TCP too) protocol. According to the STUNT protocol, each of the devices 100 sends a request to the NAT traversal server (e.g., registration/proxy server 130A), and receives the following information from that server 130A: the device's public address, the type of NAT router it is behind, and which Internet-side port and local port have been mapped together by the NAT router.

Although STUNT has been disclosed as an exemplary type of NAT traversal protocol for the present invention, other types of NAT traversal techniques/protocols may be implemented as will be contemplated by those of ordinary skill in the art.

According to an exemplary embodiment, each user agent 200 capable of acting as a server agent 200A includes a NAT traversal module for implementing this algorithm. In such an embodiment, the NAT traversal module is also implemented in registration/proxy server 130A and/or user agents 200 acting as client agents 200B.

More details as to the principles of operations of the server agents 200A, client agents 200B, registration/proxy server 130A, and discovery server 130B shall be provided below in connection with FIGS. 4-9.

Figure 4:
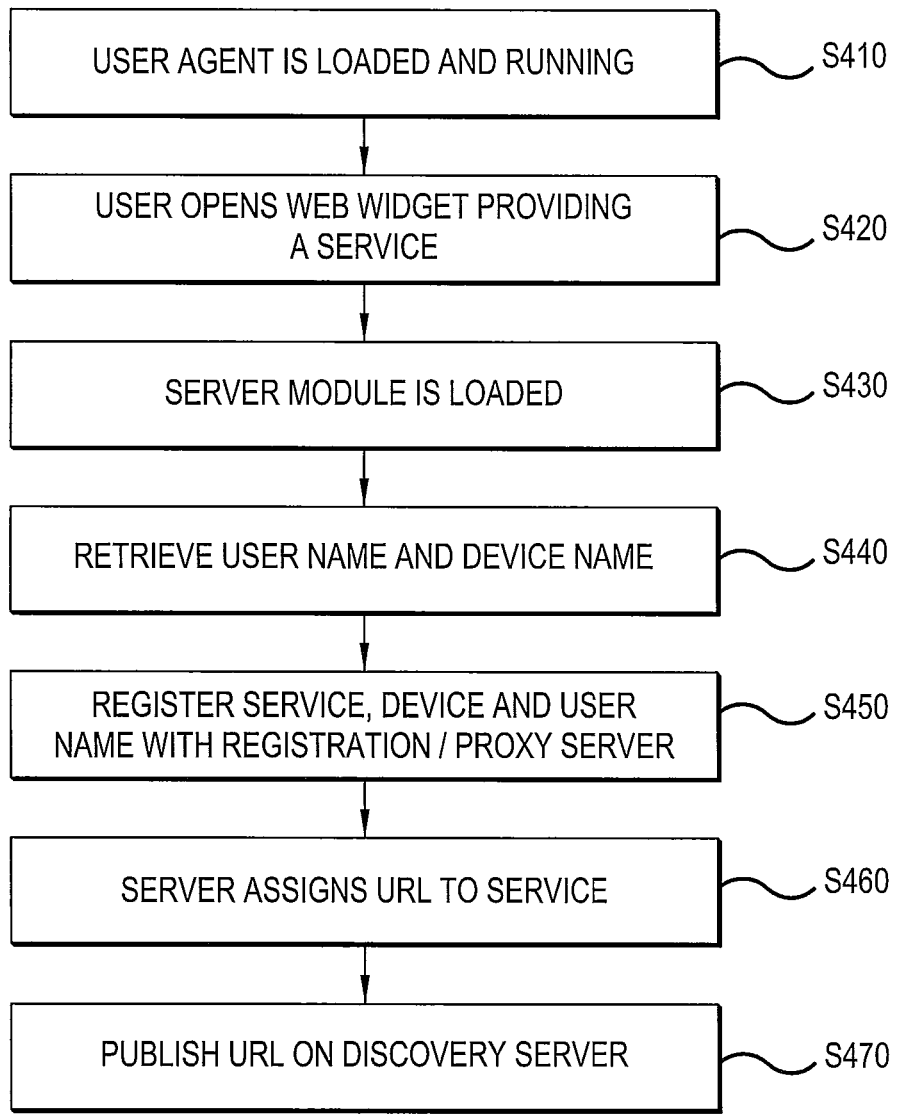
FIG. 4 is a flow chart illustrating a process whereby a user agent loads a server widget, logs into a proxy server and registers the service with a discovery server, according to an exemplary embodiment of the present invention.

FIG. 4 illustrates a process of activating a web server module 215 of a server agent 200A, and making content available to client agents 200B. Consistent with principles of the invention, the web server module 215 may be loaded when the user agent 200 itself is loaded, and run as an integral part of the user agent 200. Alternatively, e.g., for security or performance reasons, the web server module 215 may be explicitly invoked by a user, or it may be enabled by the user agent 200 automatically when the user accesses content that is identified by the user agent 200 as content intended to be published using the web server module 215.

In the exemplary embodiment illustrated in FIG. 4, the content to be published is in the form of a server widget that is identified as such by the user agent 200 (e.g., through meta data contained in the widget data), and the web server module 215 is loaded by the user agent 200 as a result of such identification. Other alternatives are within the scope of the invention, as described above.

In a first step S410 a user starts the user agent 200 on his or her computer. In a following step S420, the user agent 200 is used to access content in the form of a web widget. For the purposes of this example, it is assumed that the web widget is already present on the user's computer. The user may access the widget, e.g., by opening it using a open file command, by entering a URL representing its location in the browser address field 202, or by clicking on a representation of that particular widget in a user interface 201 part of a browser window.

In a next step S430, the user agent 200 recognizes the widget as a server widget intended for publication, and loads the server module 215 accordingly.

The server module 215 may then prepare to register the service or content provided by the server widget with a registration/proxy server 130A. In a step S440, a user name and a device name is retrieved by the user agent 200. This information may be requested from the user in a dialog box, or it may be retrieved from memory if it has been previously stored on the device.

The user name may have to be accompanied by a password in order to be accepted by the registration/proxy server 130A, and serves to identify the user as the provider of the service or data which is provided by the particular server widget. Since a user may operate several devices at the same time, e.g., a home computer and a cell phone, the device name may be necessary for unique identification of the provided content. However, alternatives are possible within the scope of the invention. According to an alternative embodiment, the user may only be allowed to register services with the registration/proxy server 130A from one device at a time. According to yet another alternative embodiment, the services provided by one user may be assigned unique names by the registration/proxy server 130A, while the actual device from which the service is made available remains invisible to users.

The information retrieved in step S440 may now be transmitted to the registration/proxy server 130A in a step S450. The server 130A may authenticate username and password, if required, and register the service. The server may then, in step S460 assign a URL to the service. According to this exemplary embodiment, the URL may be of the following format:

http://<devicename>.<username>.<proxyaddress>/<servicename>

For example, if a user with username of "johndoe" is registered as a user of a registration/proxy server 130A at the proxy address of "userservices.com," and uses his "home" computer as the device to run a service called "myslideshow," the assigned URL might be:

"http://home.johndoe.userservices.com/myslideshow"

Accordingly, this URL would allow other users, using their client agents 200B, to uniquely address the content provided by the service in the above example.

Of course, it would be beneficial to notify users of client agents 200B wishing to access the content, which is made available by a server agent 200A in the aforementioned manner of the URL that has been assigned to the corresponding service. Such notification may be done manually, e.g., by the users themselves. However, according to principles consistent with the invention, the URL may be published to a discovery server 130B. The discovery server 130B may simply be a service running on the registration/proxy server 130A. Alternatively, as illustrated in FIG. 3, the discovery server 130B may be implemented as a separate server machine, or even as a separate cluster of server machines, publishing URLs of registered services. Step S470 represents the publication of the assigned URL on a discovery server 130B.

Figure 5:
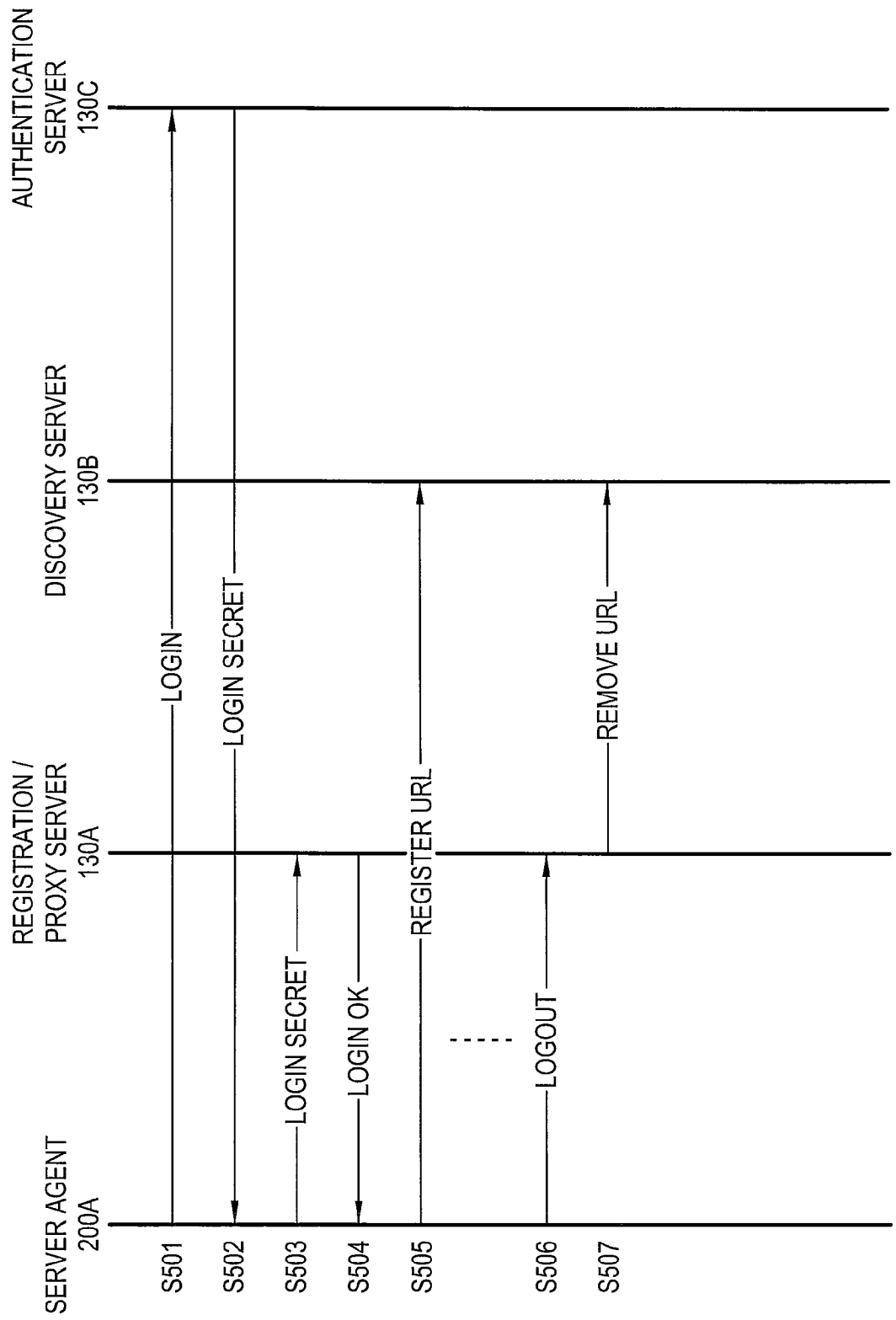
FIG. 5 is a data flow diagram illustrating a process whereby a user agent acting as a web server logs in and registers services with a external registration servers, according to an exemplary embodiment of the present invention.

Reference is now made to FIG. 5, which illustrates an example of how information may flow between the various units illustrated in FIG. 3 during the process illustrated in FIG. 4.

In a first step S501, the server agent 200A sends a login request to the authentication server 130C. The login request may include a username and a password, and may be encrypted. The username and password may be entered by the user of the server agent 200A, or it may be retrieved from a configuration file stored on the computer of the client agent 200B. In a next step S502, a secret is received from the authentication server 130C as a response to the login request. The login secret may then be forwarded by the server agent 200A to the proxy server 130A in a step S503.

According to one embodiment of the invention, a device name may be included with the login secret, and also the name or names of any services currently available from the server agent 200A, in step S503. This corresponds generally to the step S450 of FIG. 4. The registration/proxy server 130A may then register the device and services, and assign URLs to the respective services. However, according to some embodiments, the formats of the URLs may follow a strict pattern, e.g., http://<devicename>.<username>.<proxyaddress>/<servicename> and, thus, it may be unnecessary for the registration/proxy server 130A to assign URLs since the server agent 200A should be pre-programmed with the rules for naming its own services. Also, for embodiments where the user is only allowed to be logged in with one device at a time, there may be no need to include a device name with the login secret.

According to an alternative embodiment of the invention, however, a device name may be included with the login secret in step S503, but not the names of any service. The registration/proxy server 130A may then handle several devices as individual computers for example associated with different IP addresses, with different port numbers or in some other manner.

Moreover, according to another alternative embodiment of the invention, the login secret is accompanied by neither a device name nor the name of any service in step S503. As such, all incoming traffic may be directed to one IP address, and if the user has services running on several devices, distribution to the correct device may have to be handled locally in the user's local network.

After a successful login, the registration/proxy server 130A sends a confirmation back to the server agent 200A in a step S504.

The server agent 200A may now proceed to register services with the discovery server 130B in a step S505. The server agent 200A may register services according to their assigned URLs, as already described. Registration of URLs may depend on successful login with the proxy server 130A, which may be in communication with the discovery server 130B. Alternatively, the registration/proxy server 130A may be responsible for forwarding registered URLs to the discovery server 130B, in which case step S505 would be implemented by a message from the proxy server 130A to the discovery server 130C.

At this point, information regarding services available from the server agent 200A are made available to client agents 200B from the discovery server 130B. If the user of the server agent 200A starts new services or terminates old services, information to that effect will be transmitted to the discovery server 130B such that the list of available services may be modified accordingly. Alternatively, such information may be registered with the registration/proxy server 130A and forwarded to the discovery server 130B.

When the user of the server agent 200A decides to log out and terminate all services, or alternatively to log out from one device and terminate all services available from that device, a logout message is sent from the server agent 200A to the registration/proxy server 130A in a step S506. The registration/proxy server 130A may react by logging out the user or the device. The registration/proxy server 130A may also be configured to log out users or devices if they are not heard from or do not respond to regular requests to confirm that they are active. Such a procedure may prevent a device from remaining logged in after it has abnormally terminated, for example as a result of a computer crash, and has been unable to send a logout message.

In a step S507, after the registration/proxy server 130A has logged out a user or a device, it may forward a message to the discovery server 130B instructing the discovery server 130B to remove URLs that represent services that are no longer available. However, it is not necessary for the server agent 200A to be logged out (according to step S506) for the message of step S507 to be sent. For instance, the server agent 200A may instruct the discovery server 130B to remove the URLs of services no longer to be made available. Alternatively, the registration/proxy server 130A may still be responsible for notifying the discovery server 130B to remove URLs in cases where the server agent 200A is no longer active, despite not having logged out.

The messages going back and forth between the various computers and devices as described above with reference to FIG. 5 primarily concern login and registration of new services. However, it may also be necessary to ensure that client agents 200B are able to communicate with the server agent 200A.

Figure 6:
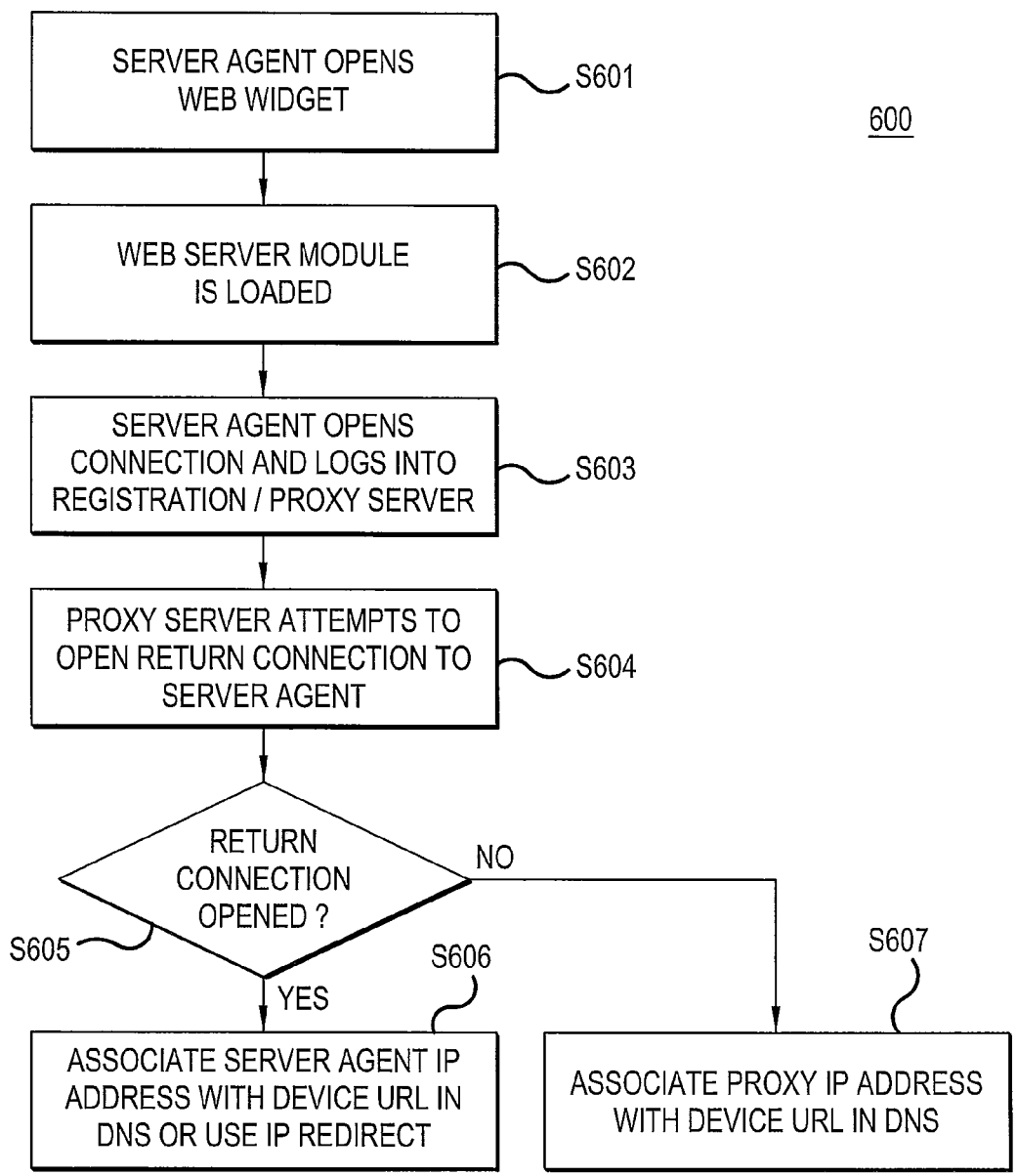
FIG. 6 is a flow chart illustrating a process whereby a user agent acting as a server loads a web widget providing a service and logs into a proxy server, whereupon the proxy server determines how the service can be reached, according to an exemplary embodiment of the present invention.

Various aspects of the invention relating to communication between devices in located in different networks will now be described with reference to FIG. 6.

The process starts when, in a first step S601, the server agent 200A opens a server widget or some other content that should be published from the server agent 200A. The content may be identified as a web widget by the server agent 200A, or it may explicitly be designated as web server content by the user. In any case, if the web server module 215 is not already loaded, it is invoked and loaded in a step S602. Furthermore, if the user or the particular device upon which this instance of the server agent 200A is running is not logged in, a connection to the registration/proxy server 130A is opened and a login procedure is completed in step S603. At this time the server agent 200A may register the URLs of any services with the discovery server 130B. The login procedure and registration with the discovery server 130B has been described in further detail above, and may involve an authentication server 130C.

As soon as the login procedure is completed, the registration/proxy server 130A may attempt to determine whether and how the server agent 200A may be reached. The registration/proxy server 130A may make such determination by attempting to open a connection to the server agent 200A based on the IP address of the server agent 200A, without using any form of NAT traversal, as shown in step S604. If a connection is determined to be successfully opened in step S605, this means that the server agent 200A can be reached directly at the IP address which it uses to communicate with the public part of the network. Accordingly, the process moves on to step S606.

According to step S606, the registration/proxy server 130A may register the IP address of the server agent 200A and its associated root URL with a Domain Name System (DNS) server, thereby allowing requests from client agents 200B to go directly to the server agent 200A. Alternatively, step S606 may cause the URL to resolve to the registration/proxy server 130A, so that the registration/proxy server 130A can use an IP redirect (instead of NAT traversal) whenever a request for a service hosted by such a reachable server agent 200A is received. In this case no modification to any DNS server entry will be necessary, and a wildcard entry in the DNS will resolve to the proxy server 130A.

According to step S606, the server agent 200A may be assigned a URL corresponding to the username. For example, the URL assigned to the server agent may be post-fixed by the domain name of the registration/proxy server 130A, and prefixed by the protocol (HTTP) and username, as shown below:

http://<username>.<domain name of registration/
   proxy server>/

Thus, in this example, if the username is "example_name" and the domain name of the registration proxy server 130A is "example_server.com," the following URL would be assigned to the server agent 200:

"http://example_user.example_server.com/"

According to another embodiment, it would be possible in step S606 for the registration/proxy server 130A to assign a device name associated with the user agent 200, and make this device name part of the assigned URL. For instance, the assigned URL may have the format shown below.

http://<device name>.<username>.<domain name of
   registration/proxy server>/

If a URL representing the root of the server agent 200A has been associated with the IP address of the server agent 200A in a DNS server according to step S606, and any services registered by the server agent 200A with the discovery server 130B, the server agent 200A may proceed to handle requests received from client agents 200B. The return connection from the registration/proxy server 130A to the server agent 200A may now be closed. However, according to some embodiments of the invention, the return connection could be maintained. An open return connection between the registration/proxy server 130A and the server agent 200A may be referred to as a control connection.

Referring again to FIG. 6, if it is determined in step S605 that the registration/proxy server 130A is unable to open a return connection to the server agent 200A using its external IP address, the process moves on in step S607 where the proxy server 130A registers its own IP address with the domain root URL of the server agent 200A in a DNS server. This means that requests from client agents 200B will go first to the registration/proxy server 130A to be forwarded to the server agent 200A. However, step S607 might not require the registration/proxy server 130A to register its IP address with the server agent's 200A domain root URL in the DNS server in every instance. For example, it would be possible for the registration/proxy server 130A to be already registered with a wildcard entry in the DNS server, in which case all requests matching the domain name of the registration/proxy server 130A, without regard to the device name and username in such request, will resolve to the proxy server 130A. The control connection between the registration/proxy server 130A and the server agent 200A may remain open, e.g., in order to initiate NAT traversal and to monitor the online status of the server agent 200A.

Figure 7:
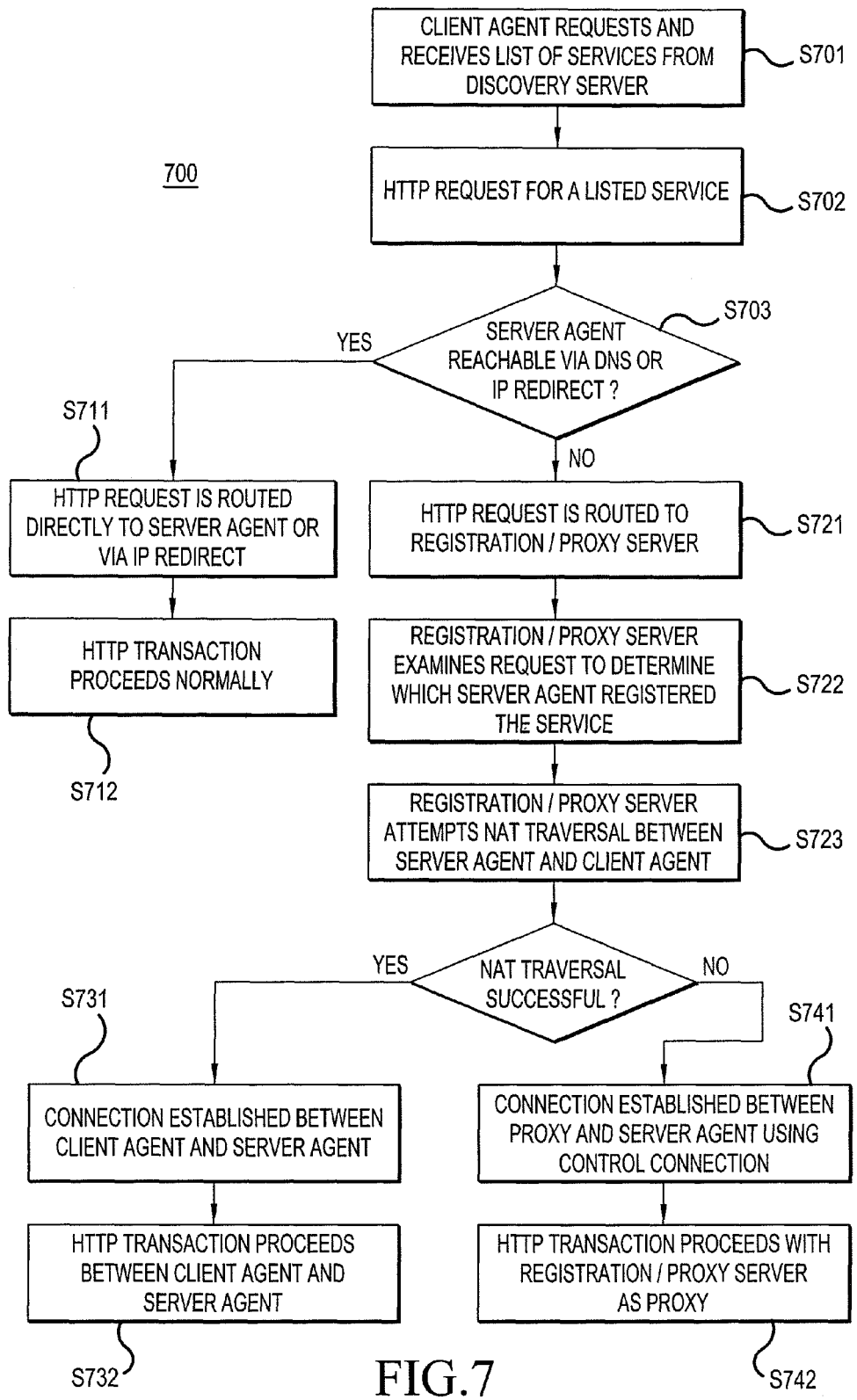
FIG. 7 is a flow chart illustrating a process whereby a user agent acting as a client can request a service provided by a user agent acting as a web server, according to an exemplary embodiment of the present invention.

FIG. 7 illustrates a process 700 whereby a client agent 200B can request a service, which is being provided by a server agent 200A, according to an exemplary embodiment.

Step S701 illustrates how a client agent 200B can request a list of services from a discovery server 130B. The list will typically be previously registered by the server agent 200A, as already described, and may be provided to the client agent 200B for example as a HTML document. Based on the received list of services, a user of the client agent 200B may select a service, for example by clicking on a hyperlink representing the service. As a result the client agent 200B may issue an HTTP request for the listed service according to step S702.

In step S703, a decision is made, based on the HTTP request, as to whether or not the corresponding server agent 200A is either directly available via DNS, (i.e., the URL can resolve directly to the IP address of the server agent 200A) or available via IP redirect (as described above in connection with FIG. 6). If step S703 decides in the negative, this means that the server agent 200A is hidden behind a NAT router, and the URL resolves to the IP address of the registration/proxy server 130A.

If step S703 determines that the URL can resolve directly to the server agent 200A via DNS, or that an IP redirect can be used (i.e., the URL can resolve to the registration/proxy server 130A, and then rerouted directly to the server agent 200A without NAT traversal or control connections), the HTTP request is routed accordingly in step S711, and the HTTP transaction may proceed normally in step S712. As such, HTTP transactions and any subsequent communication between widgets or scripts may be performed directly between the server agent 200A and the client agent 200B.

On the other hand, if step S703 decides that the server agent 200A is not reachable by DNS or IP redirect, and the URL resolves to the registration/proxy server 130A, the HTTP request is routed to the registration/proxy server 130A in step S721. The registration/proxy server 130A may then analyze the request in step S722 to determine which server agent 200A registered the service. According to an exemplary embodiment, this may be determined from the prefix to the domain name in the requested URL, including the device name and the user name. After the corresponding server agent 200A is determined, the registration/proxy server 130A may attempt to use NAT traversal to establish a connection between the server agent 200A and the client agent 200B as illustrated in step S723.

If NAT traversal can be established successfully, as indicated in the "YES" outcome of step S723, a connection can be established directly between the server agent 200A and the client agent 200B in step S731. Successful NAT traversal will typically depend on the presence of NAT traversal capabilities in the web server module 215 of the server agent 200A, and corresponding capabilities in the client agent 200B. According to one embodiment of the invention the client agent 200B and the server agent 200A are user agents 200, e.g. web browsers, with capabilities similar to both web server capabilities and NAT traversal capabilities. As such, HTTP requests from the user agent 200 operating as a client agent 200B can be handled by the NAT traversal module part of the web server module 215 of the client agent 200B.

According to one embodiment of the invention, the NAT traversal technique of UDP hole punching can be used, in which case the registration/proxy server 130A may include a STUNT server. An example of this is described below.

UDP hole punching generally works by letting two hosts A and B, which are both located behind respective NAT devices NA and NB, each begin a UDP conversation with a public server S which has a globally reachable IP address. The NAT devices NA and NB establish UDP translation states and assign temporary external port numbers. The server S relays these port numbers back to the clients A and B. The two hosts A and B can now contact each other's NAT devices directly on the translated ports. The NAT devices use the previously created translation states, and send received packets to A and B, respectively. Other NAT traversal techniques are within the scope of the invention, for example TCP hole punching.

STUNT is a protocol used for NAT traversal. STUNT is short for "STUN and TCP too," and the protocol is based on STUN. The original protocol for STUN is described in the publication "Simple Traversal of User Datagram Protocol (UDP) through Network Address Translators (NATs)," J. Rosenberg et al., RFC 3489, Internet Engineering Task Force (IETF), March 2003, the contents of which are hereby incorporated in their entirety by reference. The successor to the original STUN protocol is described in the publication "Session Traversal Utilities for NAT (STUN)," J. Rosenberg et al., RFC 5389, Internet Engineering Task Force (IETF), October 2008, the contents of which are hereby incorporated in their entirety by reference.

Referring again to FIG. 7, if NAT traversal has been successfully established between the server agent 200A and the client agent 200B according to step S723, a connection is established between the server agent 200A and the client agent 200B in step S731. Accordingly, the HTTP transaction proceeds normally between the server agent 200A and the client agent 200B.

If the result in step S723 is that NAT traversal cannot be successfully established, for example, because the client agent 200B does not include NAT traversal capabilities, or because one of the user agents 200 is located behind a NAT device that is incompatible with the NAT traversal technique used by the user agents 200 and the registration/proxy server 130A, the process moves on to step S741. In this case, the registration/proxy server 130A may attempt to use the control connection previously established to forward HTTP requests on behalf of this particular client agent 200B. Alternatively, the registration/proxy server 130A may invite the server agent 200A to create a new connection for the requests forwarded on behalf of this particular client agent 200B, as will be described in more detail below.

The aforementioned invite message may be used to instruct the web server module 215 of the server agent 200A to open a new control connection (e.g., a TCP connection via port 80) to the registration/proxy server 130A for the requested service. The new control connection would act as a proxy TCP connection between the server agent 200A and the requesting client agent 200B (e.g., for instances where the client agent 200B does not have the NAT traversal module). This would cause the server agent 200A to see the registration/proxy server 130A as an HTTP proxy for the requesting client agent 200B; this would also cause the client agent 200B to see the registration/proxy server 130A as an HTTP proxy for the server agent 200A, while the server agent 200A serves the client agent 200B. As an HTTP proxy, the registration/proxy server 130A would also be able to relay any necessary HTTP transactions between the client agent 200B and server agent 200A.

One advantage of the present invention is that, even if the request for a service is initiated by the client agent 200B, the web server module 215 of the server agent 200A would still be responsible for opening the control connection. Thus, a request for service from a client agent 200B (via the HTTP proxy) can pass through any firewall between the server agent 200A and the proxy server 130A. This is because, from the point of view of the firewall, the request will actually look like a response to a request sent by the web server module 215 (i.e., the request to open the control connection) of the server agent 200A.

While FIG. 7 illustrates a process 700 in which the client agent 200B initiates a request for service from the server, another embodiment of the present invention would allow the server agent 200A to invite a registered client agent 200B to take advantage of its services.

Figure 8:
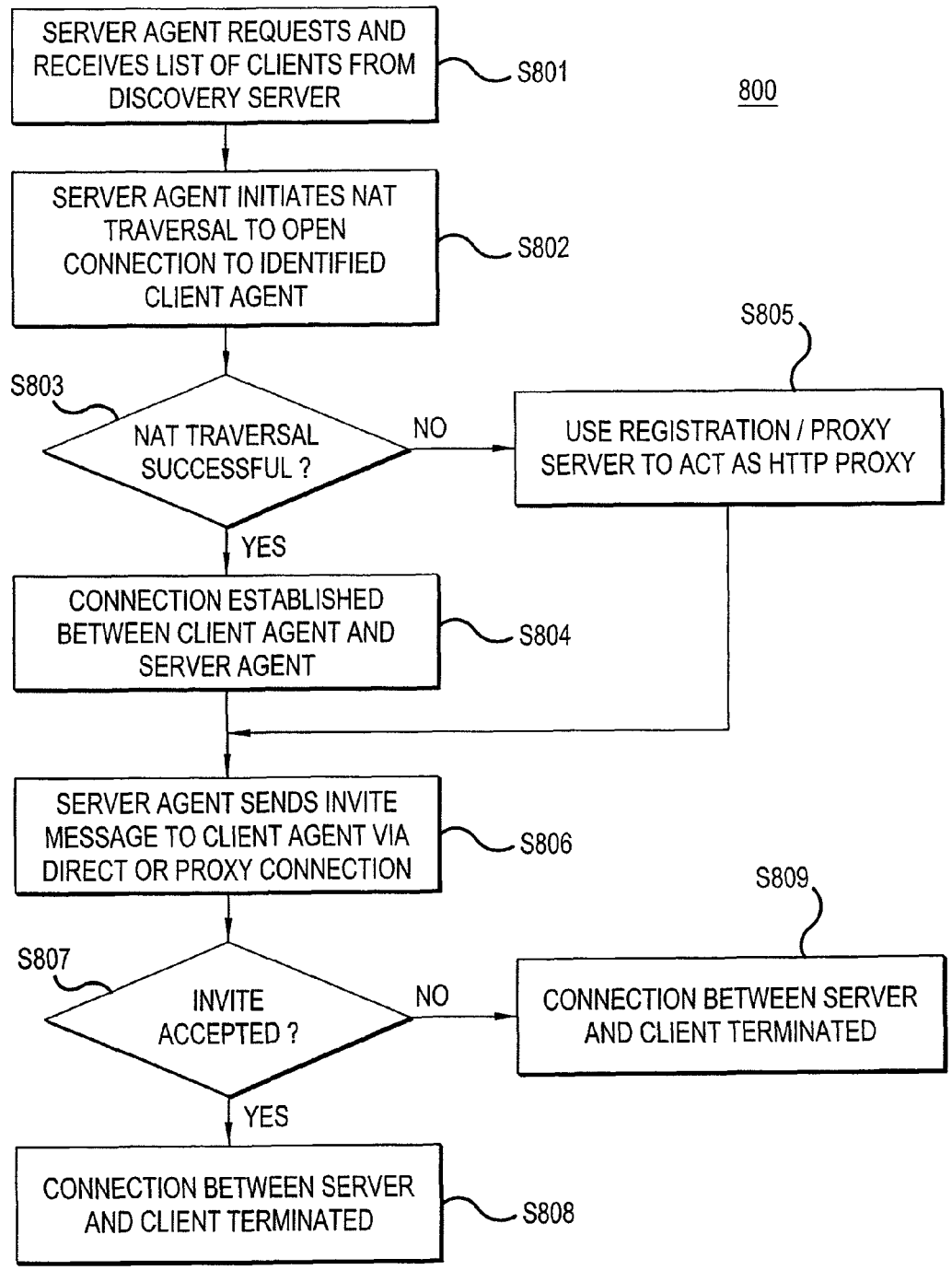
FIG. 8 is a flow chart illustrating a process whereby a user agent acting as a web server can offer services by invitation to a client agent, according to an exemplary embodiment of the present invention.

Thus, FIG. 8 illustrates a process 800 whereby server agent 200A can offer services by invitation to a client agent 200B, according to an exemplary embodiment. By sending an invitation to potential client agents 200B, this could obviate the need for the server agent 200A to register the service with the registration/proxy server 130A.

The process 800 of FIG. 8 may be useful if an end user of a server agent 200A wants to invite another end user to participate in a collaborative application. For example, and end user may want to use her web browser 200 to play chess against a friend whose browser 200 might also be logged in. Thus, the end user may want to configure her browser 200 to operate as a server agent 200A, inviting her friend to join in a game of chess using an appropriate widget or set of widgets. Alternatively, an end user might want other end users to view a slideshow of photographs she has taken, and thus might invite the other users to connect to her browser 200 in order to download the slideshow widget and associated image data. This process 800 might also be useful if an end user would like to invite other end users for a collaborative browsing application, chat windows, or other types of collaborative application as will be contemplated by those of ordinary skill in the art.

According to step S801, the server agent 200A may first send an HTTP request to the discovery server 130B for a webpage listing the usernames of other user agents or browsers 200 (which would be potential client agents 200B) that are currently logged in or registered with the registration/proxy server 130A. Alternatively, the server agent 200A may specifically request the URL associated with a particular username to determine whether a specific end user is currently logged in. However, step S801 is not essential, especially in instances where the web server module 215 of the server agent 200A otherwise knows that the client agent 200B of a desired end user is currently registered.

In step S802, the web server module 215 of the server agent 200A causes NAT traversal to be used to open a connection (e.g., TCP connection) with the client agent 200B to be invited. According to step S803, if NAT traversal is successful, the direct connection is established between the server agent 200A and client agent 200B as shown in step S804. However, if NAT traversal is unsuccessful, step S805 shows that the server agent 200A may utilize the registration/proxy server 130A to act as an HTTP proxy in a manner similar to that described above in connection with FIG. 7. For example, the server agent 200A may open a control connection (e.g., a TCP connection via port 80) to the registration/proxy server 130A to operate as a proxy connection between the server agent 200A and client agent 200B, and the web server module 215 of the server agent 200A would be able to serve the client agent 200B through this proxy connection.

In step S806, after the direct connection or proxy connection is established, the server agent 200A may be controlled by the web server module 215 to send an appropriate invite message to the client agent 200B. This invite message may inform the end user of client agent 200B as to the identity (e.g., username) associated with the end user of server agent 200A. The invite message may also identify the specific application to which the end user of client agent 200B is being asked to join.

According to step S807, the client agent 200B may accept the invitation and proceed to be served by the web server module 215 of server agent 200A according to step S808. On the other hand, if the client agent 200B declines the invitation, or simply fails to respond in a timely manner, the connection (direct or proxy) between the server agent 200A and client agent 200B may be terminated according to step S809.

As described above with respect to FIG. 8, the connection (direct or proxy) established between the server agent 200A and client agent 200B is the result of an initial request sent by the server agent's 200A web server module 215. This will cause any firewall between the server agent 200A and the client agent 200B, or between the server agent 200A and registration/proxy server 130A, to allow messages from the client agent 200B to pass to the server agent 200A, since such messages will be seen as responses to the server agent's 200A initial request.

Referring collectively to FIGS. 4-8, it should be noted that any of the steps in which the server agent 200A, registration/proxy server 130A, or client agent 200B receives a message or request from one of the other such entities may be accompanied by any procedure for authenticating the source of the message/request as will be contemplated by those of ordinary skill in the art.

Figure 9:
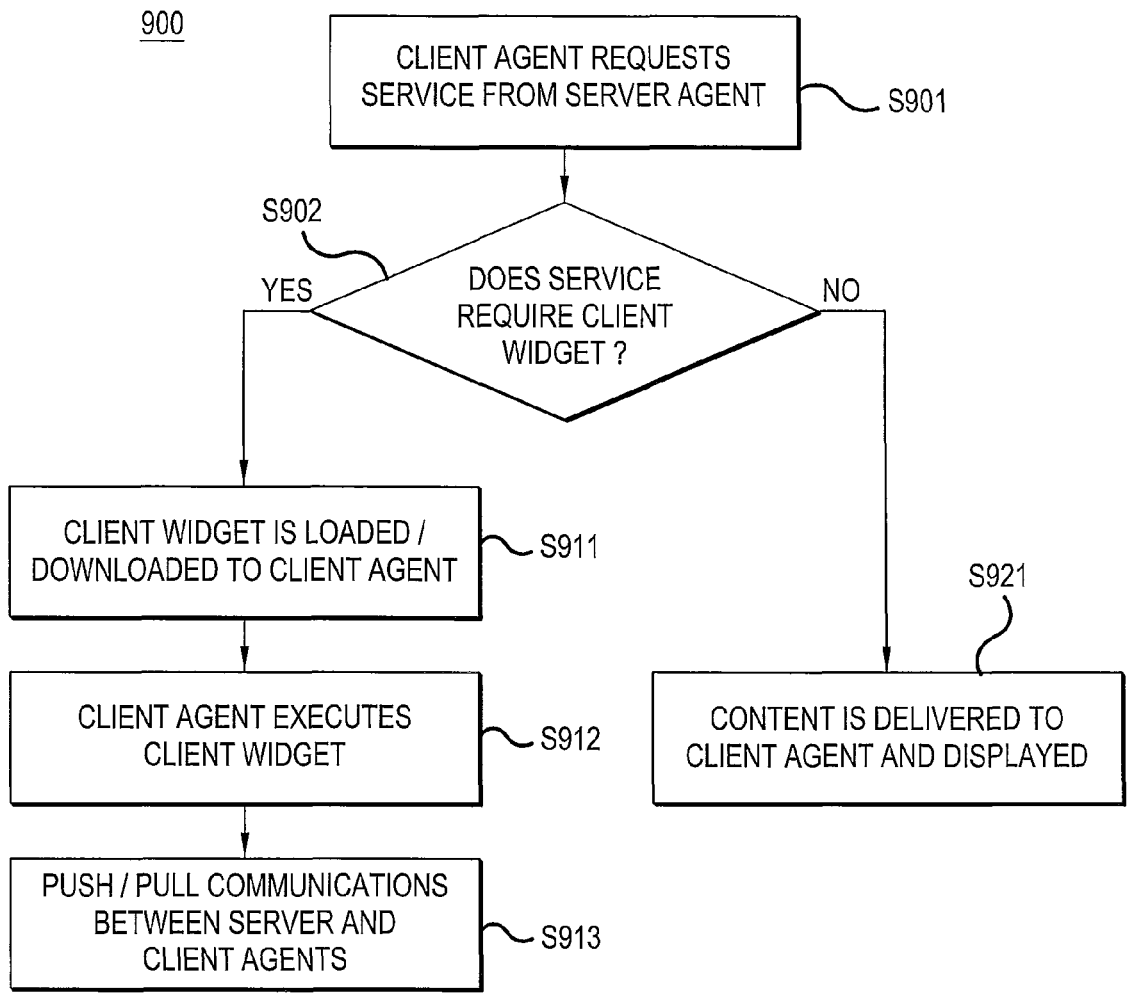
FIG. 9 is a flow chart illustrating a process whereby a user agent acting as a web server and a web server acting as a client agent interacts, according to an exemplary embodiment of the present invention.

FIG. 9 illustrates a process 900 whereby a server agent 200A may serve a client agent 200B according to particular service.

According to principles of the invention described above, either a direct or proxy connection is established between the server agent 200A and client agent 200B through which the relevant service(s) is to be provided. This connection may be established in response to a request from the client agent 200B (e.g., according to process 700 of FIG. 7), or an invitation by the server agent 200A (e.g., according to the process 800 of FIG. 8). In any case, according to step S901, the client agent 200B requests (or has already requested) a particular service from the server agent 200A. According to one aspect of the invention, the service requested from the server agent 200A may be the result of a server widget being executed by the server agent 200A and the service may require execution of a similar client widget on the client agent 200B. If this is the case in step S902, the process moves on to step S911 where the client agent 200B is caused to load or download the necessary client widget.

There are multiple ways in which step S911 can be accomplished. One way is that a message may be transmitted from the server agent 200A to the client agent 200B instructing a user of the client agent 200B to manually load the client widget. Another possible way is that the widget itself is transmitted automatically from the server agent 200A to the client agent 200B in response to the initial request (S901) from the client agent 200B. A third possibility is that the widget is identified by a response (or an invitation) received from the server agent 200A, which includes a reference to a location on the internet from which the widget may be downloaded. According to another possibility, the widget may be already installed on the client device, and it is loaded by the client agent 200B in response to instructions sent by the server agent 200A or as a result of a user accepting an invitation from the server agent 200A. Another possibility is that the widget may already have been loaded by the client agent 200B, and it may have been the client widget that instructed the web server module 215 to issue the first initial request to the server agent 200A for service.

In case the widget is not already present on the client device hosting the client agent 200B when step S911 is performed, the server agent 200A may be controlled by its web server module 215 to use the aforementioned connection to deliver a widget or set of widgets (and/or any other data) to the client agent 200B which are necessary to provide the relevant service, or instruct the client agent 200B to download the necessary widget or widgets from a location, e.g., on the Internet.

According to step S912, the client agent 200B may execute the widget(s). Thereafter, if the relevant service necessitates the server agent 200A to provide further data or files to the client agent 200B, it may be necessary for the web server module 215 to cause such data/files to be pushed to the client, similar to how conventional web servers push data to clients. In another instance, during the course of being served, the end user of the client agent 200B may want to perform a pull operation to request additional data or files form the web server module 215 of server agent 200A. In another instance, the client widget may require a push of data from the client agent 200B to the server agent 200A, or pull operations to be performed by the server agent 200A to request additional data or files from the client agent 200B. It should be noted that push and pull operations, or even simple HTTP requests from the server agent 200A to the client agent 200B which enable certain forms of collaboration that are otherwise difficult to establish, may require the client agent 200B to include a web server module 215 similar to that of the server agent 200A.

According to step S913, such push and pull communications may be conducted via the direct or proxy connection between the server agent 200A and client agent 200B. Even if a proxy connection were being used, the registration/proxy server 130A could simply act as an HTTP proxy, rather than a conventional web server. Thus, the present invention would allow the widget developer to design the widget(s) for a particular service as a p2p application, without requiring a server dedicated to enabling p2p operation.

It should be noted that it is not a requirement for the client agent 200B to execute a widget to access a relevant service from the server agent 200A. According to principles of the present invention, the server agent 200A may also be controlled by the web server module 215 to offer simple HTML services, e.g., provide static web pages and files to the client agent 200B via the direct or proxy connection. Referring again to FIG. 9, if step S902 decides that the service requested by the client agent 200B does not require a client widget to be executed by the client agent 200B, the process may proceed to step S921 where the client agent 200B receives content from the server agent 200A to be displayed or otherwise utilized by the client agent 200B. The communications between the client agent 200B and the server agent 200A may in this case consist primarily of simple HTTP requests and responses.

While particular embodiments are described above for purposes of example, the present invention covers any and all obvious variations as would be readily contemplated by those skilled in the art.

The invention claimed is:

1. A computer device comprising:
computer-readable storage equipment on which is stored:
   computer code for a web browser including:
      a script engine;
      a web server module configured to receive HTTP requests, execute scripts using the script engine, and transmit data resulting from the executed scripts in response to the HTTP requests, and
      a script that is a server widget which, when executed by the script engine, implements a service of producing webpage content which is not static; and
   at least one processor configured to execute the web browser in order to:
      conduct communications with an external server to establish a communication channel via the Internet through which the executed web browser may receive an HTTP request from a remote device executing another web browser; and
      transmit content associated with the script to the remote web browser via the communicative link in an HTTP response to the HTTP request from the remote web browser,
   wherein the communication channel is established in such manner that the external server operates as a proxy of the service implemented by the server widget, and both the HTTP request from the remote web browser and the HTTP response from the executed web browser pass through the external server.

2. The computer device of claim 1, wherein the communication channel is further used to provide a peer-to-peer connection between the executed web browser and the remote web browser for a collaborative application.

3. The computer device of claim 1, wherein the communication channel is a TCP connection.

4. The computer device of claim 3, wherein the execution of the web browser further causes the at least one processor to:
   perform NAT traversal based on the communications with the external server, the NAT traversal being performed in order to open the TCP connection.

5. The computer device of claim 1, wherein the execution of the web browser further causes the at least one processor to:
   perform NAT traversal to open a TCP connection to the external server; and
   register a service, which is provided by the server widget, with the external server via the TCP connection such that the registered service is assigned a URL and listed in a web page transmitted to the remote web browser.

6. A method comprising:
storing a script in a computer device, the script being a server widget which, when executed by the script engine, implements a service of producing webpage content which is not static;
utilizing at least one computer processor to execute on the computing device a web browser including:
a script engine;
a web server module configured to receive HTTP requests, execute scripts using the script engine, and transmit data resulting from the executed scripts in response to the HTTP requests;
the computer device performing the following with the executed web browser:
conduct communications with an external server to establish a communication channel via the Internet through which the executed web browser may receive an HTTP request from a remote device executing another web browser via the Internet; and
transmit content associated with the script to the remote web browser via the communicative link in an HTTP response to the HTTP request from the remote web browser,
wherein the communication channel is established in such manner that the external server operates as a proxy of the service implemented by the server widget, and both the HTTP request from the remote web browser and the HTTP response from the executed web browser pass through the external server.

7. The method of claim 6, further comprising utilizing the at least one computer processor to use the communication channel to provide a peer-to-peer connection between the executed web browser and the remote web browser for a collaborative application.

8. The method of claim 6, further comprising utilizing the at least one computer processor to establish the communication channel as a TCP connection.

9. The method of claim 8, further comprising utilizing the at least one computer processor to perform NAT traversal based on the communications with the external server, the NAT traversal being performed in order to open the TCP connection.

10. The method of claim 6, further comprising utilizing the at least one computer processor to:
perform NAT traversal to open a TCP connection to the external server; and
register a service, which is provided by the server widget, with the external server via the TCP connection such that the registered service is assigned a URL and listed in a web page transmitted to the remote web browser.

11. A non-transitory computer readable storage device on which are stored computer instructions which, when executed by a computer, executes a web browser which performs the following process:
conducting communications with an external server to establish a communication channel via the Internet through which the executed web browser may receive an HTTP request from a remote device; and
transmitting content to the remote web browser via the communicative link, the content being associated with a script which is stored in the computer, in an HTTP response to the HTTP request from the remote web browser,
wherein the stored script is a server widget which, when executed by the script engine, implements a service of producing webpage content which is not static, and
wherein the executed web browser includes:
a script engine;
a web server module configured to receive HTTP requests, execute scripts using the script engine, and transmit data resulting from the executed scripts in response to the HTTP requests, and
wherein the communication channel is established in such manner that external server operates as a proxy of the service implemented by the server widget, and both the HTTP request from the remote web browser and the HTTP response from the executed web browser pass through the external server.

12. The computer readable storage device of claim 11, wherein the communication channel is used to provide a peer-to-peer connection between the executed web browser and the remote web browser for a collaborative application.

13. The computer readable storage device of claim 11, wherein the communication channel is a TCP connection.

14. The computer readable storage device of claim 13, wherein the process further comprises performing NAT traversal based on the communications with the external server, the NAT traversal being performed in order to open the TCP connection.

15. The computer readable storage device of claim 11, wherein the process further comprises:
performing NAT traversal to open a TCP connection to the external server; and
registering a service, which is provided by the server widget, with the external server via the TCP connection such that the registered service is assigned a URL and listed in a web page transmitted to the remote web browser.

16. A computer device comprising:
computer-readable storage equipment on which is stored:
computer code for a web browser selectively operating as both a client and a server, the web browser including:
a script engine;
a web server module configured to receive HTTP requests, execute scripts using the script engine, and transmit data resulting from the executed scripts in response to the HTTP requests, and
a script that is a server widget which, when executed by the script engine, implements a service of producing webpage content which is not static, the server widget configured to be executed under control of the web browser; and
at least one processor configured to execute the web browser in order to:
operate the web browser as a client that:
opens a connection to an external server, and
transmits a request to the external server to register an association between the computer device and an IP address to be selected on the basis of the external server's ability to open a return connection to the computer device, and
operate the web browser as a server that:
receives an HTTP request for content associated with the service that is sent by a web browser executing on a remote device based on the registered association, and
transmits to the remote device an HTTP response to the received HTTP request including the content associated with the web server widget,
wherein a communication channel is established between the executed web browser and the remote web browser using the external server such that the external server operates as a proxy of the service implemented by the server widget, and both the HTTP request from the remote web browser and the HTTP response from the executed web browser pass through the external server.

17. A registration/proxy server comprising:
at least one processor configured to perform a process including:
  receiving a registration request via a connection opened by a web browser executed by a first computer device;
  attempting to open a return connection to the web browser of the first computer device in response to the registration request; and
  registering an association between the web browser of first computer device and an IP address in a DNS server,
wherein if the attempt to open the return connection is unsuccessful,
  the registration/proxy server registers its own IP address in the DNS server in association with the first computer device, and
  upon receiving an HTTP request from a web browser executed by a second computer device for a content provided by a server widget implemented within the first computer device, the registration/proxy server initiates NAT traversal to establish a communication channel between the first computer device and the second computer device,
wherein the web browser of the first computer device includes
  a script engine; and
  a web server module configured to receive HTTP requests, execute scripts using the script engine, and transmit data resulting from the executed scripts in response to the HTTP requests,
wherein the server widget is one of the scripts executed by the script engine, and
wherein the communication channel is established in such manner that the registration/proxy server operates as a proxy of the service implemented by the server widget, and both the HTTP request from the web browser of the second computer device and the HTTP response from the web browser of the first computer device pass through the registration/proxy server.

* * * * *